Patented Aug. 19, 1941

2,253,061

UNITED STATES PATENT OFFICE 2,253,061

MANUFACTURE OF FRUIT ACIDS

Gordon Manley Cole, Corona, Calif., assignor to California Fruit Growers Exchange, Los Angeles, Calif., a corporation of California No Drawing. Application March 14, 1940, Serial No. 323,893

10 Claims. (Cl. 260—535)

This invention relates to the use of ionic exchange materials such as zeolitic materials and analogous substances for the treatment of acidic liquors, and, in particular, liquors to be used for the production of fruit acids and their salts.

My invention has been particularly developed with relation to the production of citric acid and citric acid salts from lemons. However, it is not limited to the production of citric acid from this source, nor to the production of citric acid, but is applicable in general to fruit acids, and their salts, especially those produced in crystalline form.

These substances as they occur or are produced, as, for example, by biological means, are not pure aqueous solutions, but need to be purified, sometimes quite extensively, in the course of their recovery. My invention comprises the application to these purifying processes of ionic exchange materials such as zeolitic materials, and in particular certain carbonaceous hydrogen zeolitic materials which are capable of exchanging one cation for another, including the exchange of the hydrogen ion for another cation.

Accordingly, an object of my invention is the purification of acidic liquors of fruit acids by removal therefrom of undesired materials through the action of said ion exchange substances. Other objects and advantages will appear more fully hereinafter in part, and will in part be obvious to those skilled in the art from the use and contemplation of my invention.

Where it is desired to use a zeolitic material capable of exchanging the hydrogen ion for another cation I prefer to employ a carbonaceous hydrogen zeolite such as that described in the Transactions of the American Society of Mechanical Engineers for May, 1938, pages 315–325. In connection with this material I have made the surprising discovery that it may be capable of increasing the hydrogen ion concentration of liquors which are already highly concentrated with respect to citric acid and have an acidity of approximately pH 1. I make use of this discovery in the treatment and purification of fruit acid liquor, and in particular citric acid liquor, for the removal of metallic ion impurities preparatory to crystallization of the acid. Further, this enables me to so modify the usual commercial process as to limit or reduce the amount of other acidic ions, particularly sulfuric acid added during the course of manufacture.

In the production of citric acid from lemons, a variety of impurities must be contended with. These are in part natural constituents of the lemon or other source material from which the acid is to be derived. In part they may be contaminations acquired by the liquor in the course of treatment, particularly by solution of a portion of the surface metals of the apparatus in which the acidic liquors are handled. For example, in the handling of lemons to produce citric acid, the lemons are customarily crushed between rolls to express the juice. In such a treatment, there is usually a very free contact with oxygen, and the expressed juice will contain large quantities of it, thus to a considerable extent promoting corrosion of the apparatus.

The classical method of recovering citric acid from fruit juices and liquors containing the same, consists of precipitation of the acid from the liquor as calcium citrate, followed by filtration and discard of the filtrate to remove impurities. The calcium citrate is then decomposed by means of sulfuric acid and the calcium sulfate is removed by filtration. The citric acid is then recovered from this liquor by concentration, followed by crystallization.

In actual practice, it is found that the various reactions upon which the foregoing process depends do not, in fact, go to perfect completion. While they do operate sufficiently to permit the manufacture of citric acid of very high purity, when the operations are all very carefully controlled, they leave much to be desired, particularly as regards certainty and ease of operation. Furthermore, in this process, small amounts of alkaline earth materials are carried on by the liquors.

In the usual processes the "decompose" liquor after removal of the calcium sulfate by filtration is concentrated and then crystallized to recover crude or "brown" citric acid. The mother liquor from this crystallization may be further concentrated and one or two additional crops of crystals may be removed therefrom. The impure mother liquor thus resulting is usually returned to the beginning of the process and the citric acid is again precipitated out as calcium citrate.

The brown acid is dissolved and in the usual commercial practice as heretofore employed has ordinarily been subjected to a chemical purification to remove any metallic impurities carried over from the original liquor or picked up from the apparatus during the course of the process. At this stage it is particularly important to see that impurities, such as lead and iron, are substantially removed. The chemical treatment consists of the addition of a variety of reagents, depending upon the particular impurities to be removed, and is followed by a filtration step. I have found that instead of employing this troublesome and time-consuming series of steps it is possible simply to pass the liquor through a bed of carbonaceous hydrogen zeolite and then pass it directly to the concentration step. By such an operation a very high proportion of the metallic ions present in the liquor may be eliminated.

After concentration of this purified liquor the final purified or "white" acid is removed by crystallization. The crop of crystals is separated from the mother liquor and the mother liquor is then subjected to further crystallization, usually in conjunction with additional liquor from the dissolved crude acid. Such metallic impurities as may still be present in the liquor will, of course, be greatly concentrated by such a series of crystallizations. This liquor can be further purified by treatment with the carbonaceous hydrogen zeolite as above described.

Instead of treating the liquor formed by the solution of the crude acid, I may proceed in accordance with the conventional procedure outlined above, and purify this liquor by chemical means. This purified liquor will then be used for crystallization of the white acid. I find it highly desirable to introduce the treatment with the ionic exchange material at this point to remove the metallic ions prior to reintroduction of this mother liquor into further crystallations of the white acid.

At an earlier stage in the process, namely at the decomposition of the calcium citrate, in order to obtain sufficiently complete precipitation of calcium sulfate to give a satisfactorily thorough removal of the calcium ion, it is usually regarded as good practice to add a considerable excess of sulfuric acid, thus utilizing the excess of sulfate ion to depress the solubility of the calcium sulfate. This excess sulfuric acid, of course, goes on with the citric acid liquor, and may become highly concentrated as citric acid is removed from the liquor in successive crystallizations. In fact it may become so concentrated as to tend to char or otherwise assist in decomposition of the residual citric acid in the mother liquor recovered from the successive crystallizations.

It will obviously be advantageous at this point to have a lower concentration of sulfuric acid in the liquors used for crystallization of the citric acid. I have found that this is possible of accomplishment in the following manner:

I employ an amount of surfuric acid just slightly more than necessary to give the theoretical decomposition of the calcium citrate. Obviously upon filtration, it will be found that a somewhat higher proportion of calcium sulfate will have remained in the filtrate than would have been the case had I employed a considerable excess of sulfuric acid. However, at this stage, I make use of an ionic exchange material for removal of the calcium ion from the liquor. Although this returns the sulfate ion of the calcium sulfate as sulfuric acid, I find that the total amount of sulfuric acid thus present in the liquor may be considerably reduced below that which would have been present through the use of a considerable excess to depress the solubility of the calcium sulfate.

Again, numerous attempts have been made to prepare citric acid from lemon juice or other source material by a direct crystallization. In any such process two problems that must be dealt with are the eliminaiton of the colloidal materials and the metallic ions occurring as part of the crude liquor. Some progress has been made from time to time in the solution of the problem of direct crystallization of citric acid, but such a process has not heretofore been brought into practical fruition. One stumbling block has been the inability to remove the metallic ions from the solution, or at least the difficulty with which this could be done. By means of my invention it is possible to remove the metallic ions directly from the lemon juice or other source material without removing the accompanying citrate ions and thus bring to practical realization the direct crystallization of the acid without an intermediate precipitation step.

Since lemon juice has naturally a pH in the range of 2.3 to 2.5, as disclosed on pages 127–133 of Arch. Phys. Biol., 10, 1933, it will be seen that my process is effective over a range starting with natural strength juice and including saturated citric acid.

Similarly in the manufacture of tartaric acid the usual source materials contain substantial quantities of metallic ions which it is desirable to eliminate before crystallization of the acid. These occur, for example, in the wine lees and in argol. The potassium or other cations may be directly eliminated from the crude or more or less pure cream of tartar by treating an aqueous solution of the same with the carbonaceous hydrogen zeolite.

In like manner, the use of this process may be applied to the removal of calcium or other ion in an intermediate step in the present more conventional method of recovering tartaric acid. Under present conditions, introduction of the step of treating with an ionic exchange material at such a stage presents greater economic advantages.

In the utilization of the ionic exchange material such as the carbonaceous hydrogen zeolite I at present regard it as a preferred practice to pass the liquor through a bed of the material. However, it is not essential that this be done. The important thing is to bring the liquor and the treating material into intimate contact. This may be done, for example, by mixing the material with the liquor and then removing it therefrom as by means of screening, reeling, centrifuging, filtering, or the like. Naturally, in any such process due regard must be had of the frangibility of the ionic exchange material.

Whenever in the use of these materials, tests show that substantial quantities of the cations which it is desired to remove, are, in fact, coming through in the treated liquor, the treating step with that material should be discontinued. The material may be regenerated and its ability to exchange hydrogen ions for other cations renewed by thoroughly washing it with a strong acid, as, for example, an aqueous solution of a mineral acid. The material will then be carefully rinsed in order to avoid subsequent introduction of the regenerating acid into my acid recovery processes.

Having thus described my invention in such full, clear, concise, and exact language as to enable others skilled in the art to use the same, I claim as my invention the following, including all such obvious modifications and equivalents as come within the scope of the appended claims:

1. A process for obtaining citric acid from an aqueous solution containing a high concentration of citric acid and also containing metallic ions as impurities which comprises treating the aqueous solution by intimate contact with a carbonaceous hydrogen zeolite to remove from the aqueous solution substantial quantities of the metallic ions, and then separating the aqueous solution from the zeolite and finally separating crystalline citric acid from the aqueous solution.

2. A process for obtaining a crystallizable fruit acid from an aqueous solution containing the acid in high concentrations and also containing metallic ions as impurities which comprises placing the aqueous solution in intimate contact with a carbonaceous hydrogen zeolite and then separating the aqueous solution therefrom, whereby metallic ions are removed from the aqueous solution, and crystallizing the acid from the aqueous solution.

3. A process for obtaining fruit acid from a concentrated aqueous solution containing metallic ions as impurities which comprises treating the aqueous solution with a carbonaceous hydrogen zeolite to remove metallic ions from the aqueous solution.

4. A process for obtaining fruit acid from a concentrated aqueous solution containing metallic ions as impurities which comprises treating the aqueous solution with an ionic exchange material to remove metallic ions from the aqueous solution.

5. A process for obtaining citric acid from an aqueous solution containing a high concentration of citric acid and also containing metallic ions as impurities which comprises treating the aqueous solution by intimate contact with an ionic exchange material to remove from the aqueous solution substantial quantities of the metallic ions, and then separating the aqueous solution from the exchange material and finally separating crystalline citric acid from the aqueous solution.

6. In the process for obtaining citric acid from a solution containing citric acid in approximately the concentration found in natural lemon juice, the step of removing metallic ions by use of a carbonaceous hydrogen zeolite.

7. In a process for obtaining crystallizable citric acid from aqueous solutions of acidity corresponding to a pH not greater than 2.5, the treatment of said solution with carbonaceous hydrogen zeolite for the removal of metallic impurities.

8. A process for manufacturing a crystallizable fruit acid from a solution containing the acid in high concentration and also containing metallic ions as impurities which comprises removing metallic ion impurities from the solution by treating the solution with an ionic exchange material and then separating the solution therefrom, and crystallizing the acid from the solution.

9. A process for obtaining citric acid from an aqueous solution of acidity corresponding to a pH not greater than 2.5, which comprises treating the aqueous solution with an ionic exchange material to remove metallic ions as impurities from the aqueous solution.

10. A process for obtaining crystallizable fruit acid from an aqueous solution of acidity corresponding to a pH not greater than 2.5, which comprises treating the aqueous solution with an ionic exchange material to remove metallic ions as impurities from the aqueous solution.

GORDON MANLEY COLE.